United States Patent [19]

Parduhn

[11] 3,999,430
[45] Dec. 28, 1976

[54] DIAL TIRE PRESSURE GAGE

[75] Inventor: Herman Parduhn, Palos Heights, Ill.

[73] Assignee: G. H. Meiser & Co., Posen, Ill.

[22] Filed: Sept. 2, 1975

[21] Appl. No.: 609,560

[52] U.S. Cl. ............................... 73/146.3; 73/396; 73/420

[51] Int. Cl.² .................. B60C 23/02; G01L 17/00

[58] Field of Search ............. 73/146.3, 146.8, 396, 73/420; 137/227, 228, 229

[56] References Cited

UNITED STATES PATENTS

| | | | |
|---|---|---|---|
| 1,027,461 | 5/1912 | Buttress | 73/396 |
| 1,148,361 | 7/1915 | Coxe | 73/396 X |
| 2,278,776 | 4/1942 | Fowler | 137/227 X |
| 2,280,411 | 4/1942 | Kiene | 73/420 X |
| 3,356,100 | 12/1967 | Seeler | 137/525 X |
| 3,479,868 | 11/1969 | Boyer | 73/146.8 |
| 3,521,485 | 7/1970 | Porter | 73/146.3 |
| 3,596,509 | 8/1971 | Raffaelli | 73/146.3 |
| 3,664,371 | 5/1972 | Schneider | 137/525 X |

Primary Examiner—Richard C. Queisser
Assistant Examiner—John S. Appleman
Attorney, Agent, or Firm—Rummler & Snow

[57] ABSTRACT

A dial pressure gage having a back-check valve with hand-operated pressure-relief control for maintaining readout on the gage for as long as desired combined with a length of flexible hose and quick-disconnect coupler for easy adaptation to and remote sensing of pressure.

1 Claim, 5 Drawing Figures

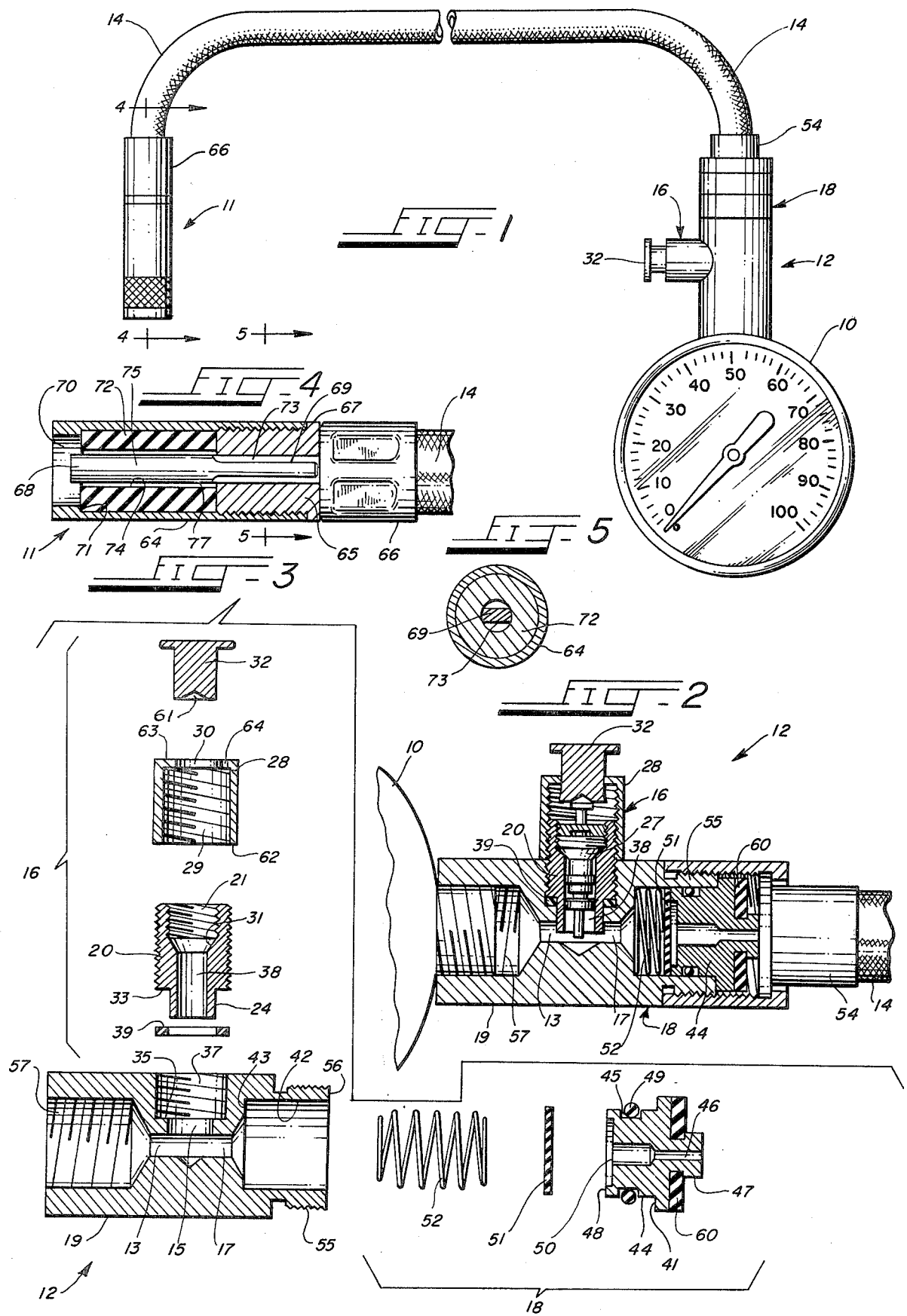

DIAL TIRE PRESSURE GAGE

BACKGROUND OF THE INVENTION

Stem-type tire pressure gages have long been used in the automotive industry. Stem-type gages are approximate gages at best and though they are rugged and have served their purpose well, there is an established need for a more precise and accurate gage for the measurement of tire air pressure and other similar applications at the field service level.

SUMMARY OF THE INVENTION

The gist of this invention lies in the adaptation of a back-flow check valve and a hand-operated pressure relief valve to a pressure gage with dial indicator readout for maintaining sensed pressure therein and the readout thereon for as long as desired. The valving combination is in fluid communication with a quick-disconnect coupler on the end of a length of flexible pneumatic hose for easy adaptation to the valve stem of a tire or other similar pressure sensing application and the opening of the poppet valve therein.

DESCRIPTION OF THE DRAWINGS

FIG. 1 shows a plan view of a tire pressure gage according to the teachings of this invention;

FIG. 2 shows a blow-up of the diametral cross-section of a fragmentary side view of the valve for maintaining and relieving pressure on the gage as desired;

FIG. 3 shows a blow-up of the diametral cross-sectional view of the expanded parts of the pressure maintenance and relief valve of FIG. 2;

FIG. 4 shows a blow-up of the diametral cross-section of a fragmentary side view of the quick-disconnect coupler along line 4—4 of FIG. 1; and FIG. 5 shows a cross-section through the quick-disconnect coupler along line 5—5 of FIG. 4.

DESCRIPTION OF THE PREFERRED EMBODIMENT

Referring to FIG. 1, the remote-sensing pressure gage comprises a conventional Bourdon-tube pressure gage 10. A pointer on the gage 10 is pivotally mounted at the center of a circular dial having pressure level indications marked thereon which are graduated in 2 psi increments from 0 to 100 psi although other pressure ranges could be used. A combination pressure maintenance and relief valve 12 having a pushbutton 32 mounted on the side thereof has a first standard female connector 57 mounted on and in fluid communication with the standard male gage connector located on the rim of the gage 10. A length of flexible hose 14 has a second standard female connector 54 on one end connected to and in fluid communication with a first standard male connector 55 on the other end of the valve 12. A quick-disconnect coupling 11 for opening the poppet valve in the valve stem of the tire has a standard female thread 67 on one end connected to and in fluid communication with a second standard male connector 66 on the other end of the flexible hose 14. The other end of the coupling 11 has a tire poppet valve actuator rod end 68 centrally located and depressed therein and is adapted for quick sealed connection to and fluid communication with the outlet from the valve stem of a standard tire or tire-tube combination and actuation of the pintle in a standard tire poppet valve assembly 27 therein by pressing against a rubber grommet 72.

The pressure maintenance and relief valve 12, as shown in FIG. 2, comprises a body 19 having a first bore 13 which has its inlet in fluid communication with the outlet of female connector 57 therein. As shown in FIG. 3, a cross-bore 15 in the body 19 intersects and has its inlet in fluid communication with the outlet of bore 13 therein. An internally-threaded counterbore 37 having a sharply-filleted bottom shoulder 35 at the bottom thereof for seating a gasket 39 connects to and has its inlet in fluid communication with the outlet from cross-bore 15. A second bore 17 in the body 19 of the valve 12 has its inlet in fluid communication with the outlet of bore 13 therein. A smooth counterbore 42 having a sharply-filleted bottom shoulder 43 therein connects to and has its inlet in fluid communication with the outlet from the bore 17. The externally-threaded male connector 55 surrounds the counterbore 42 creating a rim 56 therearound for adapting to standard female hose connector 54.

A pushbutton-operated relief valve 16 which is part of the pressure maintenance and relief valve 12, as shown in FIGS. 2 and 3, comprises an externally-threaded adaptor sleeve 20 having a pilot 24 at one end thereof which bears a concentric relation to the sleeve 20. Pilot 24 bears a slip-fit relation in the cross-bore 15 and has a sharply-filleted external shoulder 33 at the base thereof for bearing up against the gasket 39 which is inserted at the bottom of counterbore 37 against the sharp fillet 35 therein when the sleeve 20 is threadedly engaged in the internal threads of the bore 37. A third bore 38 extends through the axial length of adaptor sleeve 20 in concentric relation with pilot end 24 and in fluid communication at its lower end with the outlet of bore 15 when sleeve 20 is threadedly inserted in the body 19 of valve 12. A threaded counterbore 21 having a conical poppet valve seat 31 at the bottom thereof extends in from the upper end of sleeve 20 midway along the length of the bore 38 for threadedly engaging a standard pneumatic poppet valve 27 for mobile vehicle tire applications which seats against conical seat 31 therein, as shown in FIG. 2.

A knurled cup 28 has a threaded bore 29 extending in from the lower end thereof and a smaller smooth bore 30 in the upper end thereof creating a first rim 62 below and a cap 63 thereon, as shown in FIG. 3. Bores 29 and 30 bear a concentric relation to each other and bore 29 threadedly engages the external threads of adaptor sleeve 20 when assembled thereon. The rim 62 of cup 28 also bottoms out against the body of valve 12 as assembled thereon. An aperture 64 is located in the cap 63 of the cup 28 for venting the valve 12. The cylindrical pushbutton 32 has its shank slidably inserted in the smooth bore 30 in the cap 63 of cup 28. A lower contact end 61 of button 32 is cupped and swaged to retain the same in centered contact with the pintle of the tire poppet valve 27 which is inserted in the valve 12.

A back-check pressure maintenance valve 18 which is also part of the pressure maintenance and relief valve 12, also shown in FIGS. 2 and 3, comprises a compression spring 52 which loosely inserts in the bore 42 and has one end in seating engagement with the sharply filleted bottom 43 therein. A rubber flapper valve disk 51 which also loosely fits within smooth counterbore 42 bears a contact relation on one side thereof with the other end of compression spring 52.

A back-check valve adaptor body 44 having a shoulder 41 midway along its length and an "O" ring sealing groove 45 around the shank thereof with an O ring 49 installed therein inserts in the counterbore 42 in the body of valve 12 up against the rim 56 therearound. Flapper disk seat 48 on one end of back-check valve adaptor 44 forms a recess 50 therein. The other side of flapper disk 51 contacts the seat 48 when assembled in valve 12. Fluid communication between recess 50 and bore 17 in the body of valve 12 is checked when the pressure in recess 50 is equal to or less than the pressure in bore 17 corresponding to taking a tire pressure measurement. Fluid communication between recess 50 and bore 17 occurs when the pressure in bore 17 is less than that in recess 50. Under this pressure differential, the flapper disk 51 lifts off the seat 48 and air flows from the tire to the gage 10.

A stepped bore 46 extends axially of the length of adaptor 44 and is in fluid communication at its large end with the recess 50. A shouldered stub end 47 extends from the other end of the adaptor 44 in concentric relation therewith. A rubber washer 60 slips over the shoulder of stub 47. One face of washer 60 rests in sealing contact with the other end of the adaptor 44. The other face of washer 60 lies exposed for sealing adaptation to the standard pneumatic female hose connector 54 which is connected to the male connector 55 on the body of back-check, pressure-maintenance valve 18.

The quick-disconnect coupler 11, as shown in FIG. 4, comprises a sleeve 64 having stepped bores 70 with a shoulder 71 therebetween. The larger bore of stepped bore 70 is internally threaded in from the larger end thereof for engaging the standard male connector 66 in fluid communication therewith. A tire poppet valve actuator rod 68 having a flattened portion 69 which inserts with a press fit in the standard aperture 73 of the male connector 66 for support therefrom leaves space for flow communication thereabout between the sides of the flattened portion 69 and the annulus of the standard aperture 73 thereof. The cylindrical rubber grommet 72 has squared ends and a clearance bore 74 therethrough which bears a concentric relation to and a clearance gap 77 about the round portion 75 of actuator rod 68 which extends therethrough. Grommet 72 slip fits into the larger of stepped bores 70 bottomed at one end thereof on the shoulder 71 and pressed into position at the other end by the butt end 65 of the male hose connector 66 as assembled in the sleeve 64. The actuator rod 68 protrudes outside the end face of grommet 72 which is located at the shoulder 71 by an amount sufficient to actuate the pintle of the standard tire poppet valve 21 and still maintain a sealed relation between the rim of the tire valve stem and the end face of the grommet 72 when coupled thereto.

Although but one specific embodiment of this invention is herein shown and described, it will be understood that details of the construction shown may be altered or omitted without departing from the spirit of the invention as defined by the following claims.

I claim:
1. A tire pressure gage comprising a conventional Bourdon-tube pressure gage having a pointer pivotally mounted at the center of the circular dial and pressure level indications marked thereon; a pressure maintenance and relief valve having a body and a first female connector mounted on one end thereof in fluid communication with the male gage connector located on the rim of said gage; a first straight-through bore in fluid communication with the outlet of the first female connector; a cross-bore intersecting and having its inlet in fluid communication with the outlet of the first straight-through bore; a first internally-threaded cross-counterbore having a sharply-filleted bottom shoulder at the bottom thereof connecting to and having its inlet in fluid communication with the outlet from the cross-bore; a second straight-through bore in the body of the valve having its inlet in fluid communication with the outlet of the first straight-through bore; a smooth straight-through counterbore having a sharply-filleted bottom shoulder and connecting to and in fluid communication with the outlet from the second straight-through bore; a first male connector mounted on the other end of the pressure maintenance and relief valve around the smooth straight-through counterbore; a first rim around said other end of the pressure maintenance and relief valve; a length of flexible hose having a second female connector on one end thereof connected to and in fluid communication with and bearing on the first rim and a second male connector on the other end thereof; a quick-disconnect coupling having a threaded female connector on one end thereof connecting to and in fluid communication with the threaded end of second male connector on the other end of the flexible hose; a quick-disconnect sleeve having stepped bores with a first shoulder therebetween and the larger bore of said stepped bores extending and engaging the end of the threaded female connector for connecting to the second male connector on the other end of the flexible hose in fluid communication therewith; a second rim on the end of the quick-disconnect sleeve having the smaller bore; a tire poppet actuator rod having a flattened portion on one end inserted with a press fit in a central round aperture through the second male connector on the other end of the flexible hose and a round portion at the other end thereof centrally located in the quick-disconnect sleeve; a cylindrical rubber grommet slip fitting into the larger of said stepped bores and bottoming at one end thereof on said shoulder therebetween and pressed into position at the other end thereof by the second male connector on the other end of the flexible hose; a clearance bore through said cylindrical grommet bearing a concentric relation to and a clearance gap about the round portion of said actuator rod extending therethrough; an actuator rod end axially connected to and extending from the round portion of the actuator rod and protruding outside the one end of said grommet; an externally-threaded adaptor sleeve having a pilot at one end thereof bearing a concentric relation thereto and a slip fit relation in the cross-bore in the body of the valve and having a sharply-filleted external shoulder at the base thereof; a gasket inserted in the sharply-filleted shoulder at the bottom of the first internally-threaded cross counter-bore; a third bore extending throughout the axial length of said adaptor sleeve in concentric relation with the pilot end thereof and in fluid communication at its lower end with the outlet of the cross-bore; a second internally-threaded counter-bore in the adaptor sleeve extending from the other end therein having a conical poppet valve seat at the bottom thereof; a knurled cup having a threaded bore extending up from the rim end thereof and a smaller smooth bore extending down from the cap end thereon in mutually reciprocal concentric relation with the threaded bore engaging the external threads of the adaptor sleeve and the rim of said knurled cup bottoming out against the body of the valve; an aperture located in the cap of said knurled cup; a cylindrical pushbutton having its shank slidably inserted from above through the smooth bore in the cap of the knurled cup and its lower contact end swaged therein; a compression spring loosely inserted in the smooth straight-through counter-bore having one end in seating engagement with the sharply filleted shoulder at the bottom therein; a rubber flapper valve disk loosely fitting within said smooth counterbore bearing a contact relation on one side thereof with the other end of said compression spring; a back-check valve adaptor having a shoulder on one end and an O ring sealing groove with an O ring installed therein around the shank thereof inserted in the smooth counterbore and shouldered against the second rim around the end of the sleeve on the other end of said valve body; a flapper disk seat on the other end of said back-check valve adaptor; a recess in said seat contacting the other side of the flapper valve disk; a stepped bore axially extending the length of the adaptor in fluid communication at its large end with the recess in said seat; a shouldered stub extending from the other end of said adaptor body in concentric relation therewith; a rubber washer slipping over said shouldered stub having one face in sealing contact with the other end of the said adaptor and its other face exposed for sealing contact with the second female connector on the flexible hose; whereby the actuator rod end actuates the pintle of the tire poppet valve and the rubber grommet contacts the rim of the valve stem thereof in sealing relation therewith.

* * * * *